US005493336A

United States Patent [19]

Racek et al.

[11] Patent Number: 5,493,336

[45] Date of Patent: Feb. 20, 1996

[54] PICTURE TUBE SCREEN DEVICE HAVING WAITING STATE FUNCTION

[75] Inventors: Wolfgang Racek, Noerdlingen; Edmund Poetsch, Koenigsbrunn; Josef Meinerzhagen, Prittriching; Erwin Baessler, Koenigsbrunn, all of Germany

[73] Assignee: Siemens Nixdorf Informationssysteme AG, Paderborn, Germany

[21] Appl. No.: 240,503

[22] Filed: May 10, 1994

Related U.S. Application Data

[63] Continuation of Ser. No. 3,626, Jan. 13, 1993, abandoned.

[30] Foreign Application Priority Data

Jan. 31, 1992 [EP] European Pat. Off. .............. 92101644

[51] Int. Cl.[6] ........................................ H04N 5/68

[52] U.S. Cl. ........................ 348/378; 348/380; 315/94; 315/101

[58] Field of Search ............................ 348/377, 378, 348/380, 730, 379; 315/411, 94, 101, 86, 98, 383, 46–48; 313/37, 591; 328/270; H04N 5/68

[56] References Cited

U.S. PATENT DOCUMENTS

| | | | |
|---|---|---|---|
| 3,514,532 | 5/1970 | Ludlan | 315/101 |
| 3,767,967 | 10/1973 | Luz | 315/94 |
| 3,944,880 | 3/1976 | Harao et al. . | |
| 3,956,669 | 5/1976 | Del Ciello | 315/105 |
| 4,149,110 | 4/1979 | Dallos . | |
| 4,553,166 | 11/1985 | Sutton | 358/190 |
| 4,641,191 | 2/1987 | Sutton | 358/168 |
| 4,722,005 | 1/1988 | Ledenbach | 358/168 |

*Primary Examiner*—James J. Groody
*Assistant Examiner*—Michael H. Lee
*Attorney, Agent, or Firm*—Hill, Steadman & Simpson

[57] ABSTRACT

For preserving and, thus, for extending the useful life of a picture tube of a picture tube screen device having a waiting state function. The filament current of the picture tube in the waiting state of the picture tube screen device is reduced by at least a slight percentage of an original filament current. Also, the picture tube is supplied with another video signal, in addition to an original video signal, that generates a beam current in the picture tube having a white image level that is at least a slight percentage of an original white image level generated by the original video signal.

5 Claims, 1 Drawing Sheet

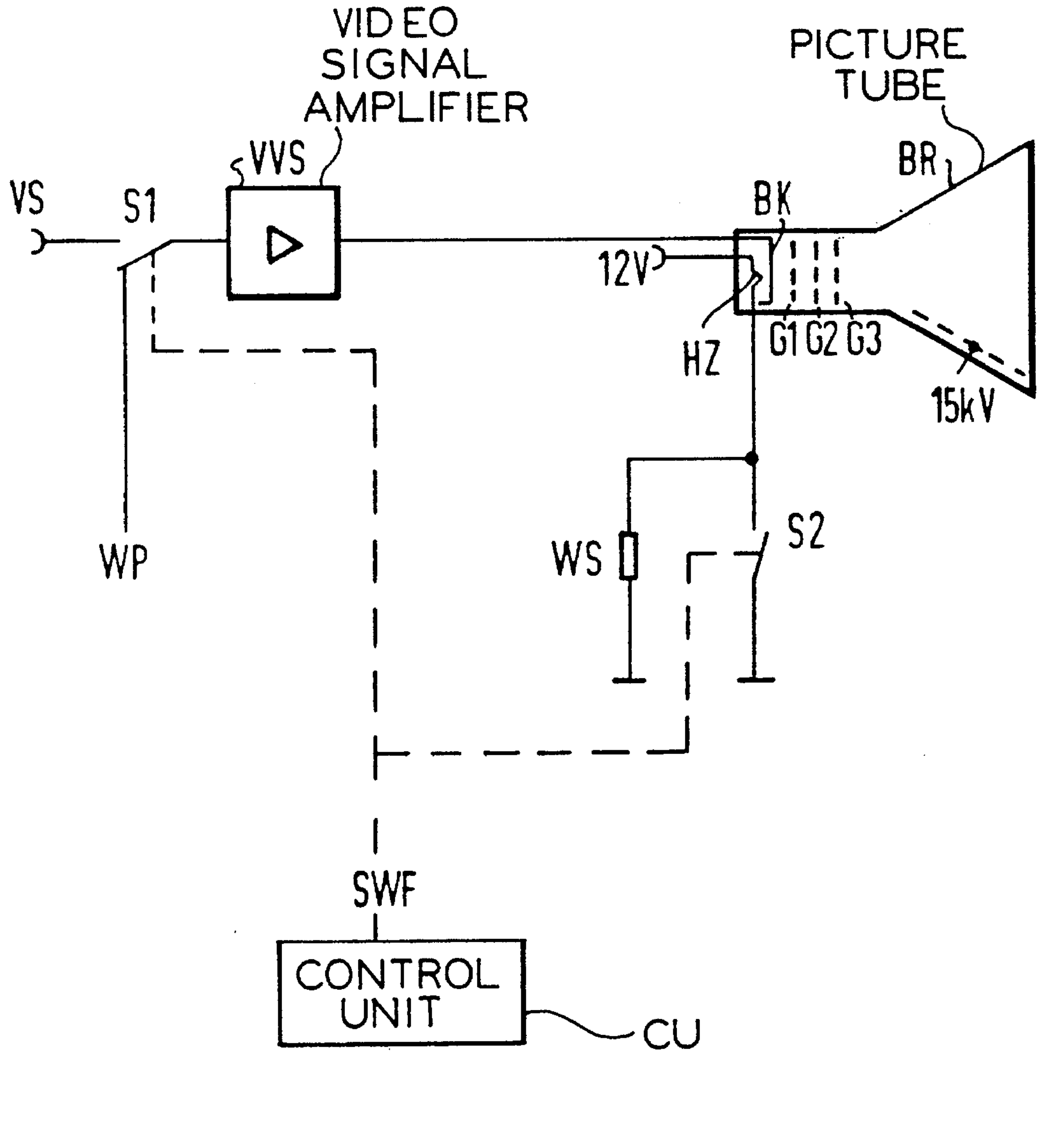
VIDEO SIGNAL AMPLIFIER
PICTURE TUBE
VVS
VS
S1
BR
BK
12V
HZ
G1 G2 G3
15kV
WP
WS
S2
SWF
CONTROL UNIT
CU

PICTURE TUBE SCREEN DEVICE HAVING WAITING STATE FUNCTION

This is a continuation of application Ser. No. 003,626, filed Jan. 13, 1993, now abandoned.

BACKGROUND OF THE INVENTION

The present invention is directed to a picture tube screen device having a waiting state function.

Picture tube screen devices such as, for example, video display terminals, are often turned on for an entire work day or, for example, in a computer center, even during an entire night, although the actual time of use amounts to only a fraction of the on time. The overall, useful operating life of a picture tube screen device is essentially limited by the life expectancy of the picture tube. The life expectancy of the picture tube is defined by the effectiveness of the heated cathode and the effectiveness of the heated cathode decreases over the course of time. In quality products, the useful life of the picture tube is approximately 10,000 hours. Due to the decrease in the effectiveness of the cathode, the brightness of the picture tube drops to 70% of the original value after the 10,000 hours.

Several solutions have been disclosed for preserving the picture tube. The picture tube screen device is brought into a waiting state or in what is referred to as a "stand-by mode". In a first solution, the monitor part is shut off and thus all voltages at the picture tube are also shut off. The disadvantage is that a heating-up phase must be passed through for every re-utilization. In a second solution, the monitor part is effectively shut off, but the heating of the picture tube is not shut off. In this way, an image, what is referred to as an immediate image, very quickly appears following a keyboard input at a video display terminal. A third solution for bringing the picture tube screen device into a waiting state is to only disconnect the video signal and thereby causing the picture tube to be dark. As a result, the picture tube continues to be heated and the grid voltages continue to be applied at the picture tube. However, none of these solutions represent favorable operating conditions for the purpose of preserving the picture tube and, thus, extending the operation of the picture tube.

A continuous heating of the picture tube without applied grid voltages or without beam current can lead to what is referred to as "cathode poisoning" that is a chemical modification of the cathode substance due to foreign atoms that leads to a reduction in the obtainable image brightness. Given frequent turning on and off of the picture tube heating, the picture tube cathode is highly stressed by the high currents at turn on and thermal load cycles.

SUMMARY OF THE INVENTION

It is an object of the present invention to provide an improved picture tube screen device having a waiting state function such that the picture tube is better preserved during changes between an operating and waiting state, thereby extending its useful life.

This object is inventively achieved by a picture tube screen device having a waiting state function that contains a picture tube having a heater. The picture tube, in the operating state of the picture tube screen device is connected to a line having an original video signal that generates a beam current with an original white image level in the picture tube and that is connected to a filament voltage that generates an original filament current. The filament current of the picture tube in the waiting state of the picture tube screen device is only slightly reduced in comparison to the original filament current. Also, the original video signal is replaced by another video signal that generates a beam current in the picture tube that has a white level that is slight in comparison to the original white image level of the original video signal. These measures reduce the risk of "cathode poisoning" in the picture tube due to chemical modification of the cathode substance because the heating capacity is reduced and a video signal is also, present that still keeps the picture tube somewhat bright. The effectiveness of the picture tube cathode is preserved and the obtainable brightness of the picture tube is thereby guaranteed over a longer time span. The immediate image function is also assured.

Advantageous developments of the present invention are as follows. The filament current is reduced by approximately 25%. The original video signal is replaced by another video signal that generates a beam current in the picture tube having a white image level of approximately 10% of the original white image level. An optimum preservation effect and, thus, a maximum useful life of the picture tube are achieved.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which like reference numerals identify like elements, and in which:

The single FIGURE shows a portion of the component parts contained in a picture tube screen device in a schematic illustration.

DESCRIPTION OF THE PREFERRED EMBODIMENT

The single figure depicts a picture tube screen device of the present invention that has a video signal amplifier VVS, a picture tube BR, a resistor circuit WS and two switches S1 and S2 that can be simultaneously switched via a common control line SWF. Since the functioning of a picture tube screen device is intrinsically known, this shall not be discussed in greater detail.

As shown in the single figure, the picture tube BR has a heater HZ for heating the picture tube cathode BK. Further, it has a plurality of grids G1 through G3 that are connected to corresponding grid voltages. The anode of the picture tube BR is connected to a 15 kV voltage and the heater HZ of the picture tube BR is supplied with a 12V voltage.

The switch S1 is a switchover means that is switched between an original video signal VS that is utilized in the operating state of the picture tube screen device, and another video signal WP that is utilized in the waiting state. The original video signal VS generates a beam current in the picture tube BR having an original white image level whose magnitude corresponds to a nominal value. The other video signal WP generates a beam current in the picture tube BR having a white image level that is at least a slight percentage of the original white image level of the original video signal VS.

Either the original video signal VS or the other video signal WP is through-connected by the switch S1 dependent on whether the picture tube screen device is in the operating state or in the waiting state. The through-connected video signal is forwarded to the video signal amplifier VVS and is then conducted to the picture tube cathode BK.

The second switch S2 can be considered as being a break contact. It is connected to the heater HZ of the picture tube BR in such a way that, in its closed condition, it applies the full filament voltage to the heater, i.e. the full 12V voltage.

The resistor circuit WS is connected in parallel to the switch S2. In the closed condition of the switch S2, the resistor circuit WS is thus bridged and has no function. However, in the open condition of the switch S2, the resistor circuit WS is in series with the heater HZ of the picture tube BR and at least slightly reduces the filament current dependent on its dimensioning.

The switch S2 is switched such that it is closed during the operating state of the picture tube screen device and is open during the waiting state.

The current state of the picture tube screen device is dependent on the afore-mentioned control signal SWF that is shared in common by the two switches S1 and S2. This control signal SWF is generated at a higher-ranking control unit CU (not shown in detail in the figure) that recognizes whether the picture tube screen device has not been used for a long time and therefore switches it into the waiting state or whether it is currently being used and therefore switches it into the operating state.

Regarding the selection of the other video signal WP and of the resistor circuit WS, for example, another video signal WP is used that generates a beam current having a white image level of approximately 10% of the original white image level produced by the original video signal VS and a resistor circuit WS is used that reduces the filament current of the picture tube by approximately 25%. When such another video signal WP and such a resistor circuit WS are simultaneously utilized, especially advantageous effects result for the picture tube BR with respect to preservation and useful life.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A picture tube screen device having an operating state and a waiting state and having a picture tube having a heater and a cathode, comprising:

said picture tube, in the operating state of the picture tube screen device, receiving an original video signal that generates a first beam current with an original white image level, whose magnitude corresponds to a nominal value, in the picture tube and being connected to a predetermined filament voltage that generates an original filament current in the heater;

switchable means for connecting said original video signal to the cathode of the picture tube and for producing said original filament current in the heater of the picture tube during the operating state of the picture tube screen device, and for disconnecting said original video signal from the cathode of the picture tube and removing said original filament current in the heater and connecting a further video signal to the cathode of the picture tube and for producing a further filament current in the heater of the picture tube during the waiting state of the picture tube screen device; and said further filament current being less than said original filament current and being greater than 75% of said original filament current, and said further video signal generating a second beam current that produces an image having a further white image level that is less than 10% of said original white image level.

2. The picture tube screen device according to claim 1, wherein said switchable means comprises a first switch for connecting one of said original video signal and said further video signal to the cathode of said picture tube dependent upon said picture tube being in one of said operating state and said waiting state, respectively, and a second switch for bridging a means for reducing filament current in the heater of the picture tube dependent upon said picture being in one of said waiting state and said operating state, respectively.

3. The picture tube screen device according to claim 2, wherein said first and second switches are controlled by a common control signal.

4. The picture tube screen device according to claim 1, wherein the further filament current has a magnitude that is approximately 25% of a magnitude of the original filament current.

5. The picture tube screen device according to claim 1, wherein the further white image level produced by the second beam current that is generated by the further video signal is approximately 10% of the original white image level produced by the first beam current that is generated by the original video signal.

* * * * *